Patented Nov. 7, 1922.

1,434,650

UNITED STATES PATENT OFFICE.

CROMWELL B. DICKEY, OF MILWAUKEE, WISCONSIN, ASSIGNOR TO PITTSBURGH PLATE GLASS COMPANY, OF MILWAUKEE, WISCONSIN, A CORPORATION OF PENNSYLVANIA.

MANUFACTURE OF CALCIUM ARSENATE.

No Drawing. Application filed March 14, 1921. Serial No. 452,287.

*To all whom it may concern:*

Be it known that I, CROMWELL B. DICKEY, a citizen of the United States, residing at Milwaukee, in the county of Milwaukee, and State of Wisconsin, have invented a new and useful Improvement in the Manufacture of Calcium Arsenate, of which the following is a specification.

The present invention relates to the manufacture of calcium arsenate and will be clearly understood from the following description thereof.

In the manufacture of calcium arsenate $Ca_3(AsO_4)_2$ by the reaction of arsenic acid upon calcium hydroxide in suspension in water, soluble acid compounds of arsenic are frequently formed in the product regardless of the care with which the materials are selected and the conditions of reaction are controlled. The presence of the soluble arsenic has been variously ascribed to the formation of calcium monohydric arsenate, calcium tetrahydric arsenate, which compounds may be occluded in the insoluble calcium arsenate and to the formation of some compounds which breaks down in the presence of water to form a soluble acid arsenate.

In accordance with the present invention the arsenate produced by the reaction of arsenic acid on calcium hydroxide may be largely or substantially freed from soluble acid arsenic compounds either as a part of the manufacture or subsequently, supplying an aqueous suspension of calcium hydroxide containing a concentration of calcium hydrate in actual solution (solution concentration) higher than normal for the temperature of the solution, with which suspension the soluble arsenic compound (or arsenic acid) may react. The higher solution concentration of the calcium hydroxide in the suspension may be secured by the addition thereto of a small proportion, say 1 to 5%, of a suitable soluble compound, for instance, a halide of an alkali metal, such as salt. The soluble compound so added should not, by its own dissociation, increase the calcium ion nor the hydroxyl ion concentration of the solution, or its addition will result in a decrease of the solution concentration of the calcium hydroxide.

In accordance with the present invention calcium arsenate may be prepared in the manner customary in the art; for example, arsenic acid may be added slowly to a suspension of calcium hydroxide in water, formed preferably by freshly slaking lime, the proportion of calcium hydroxide being somewhat in excess of that required for reaction for the production of a product containing from 40 to 50% $As_2O_5$. After completion of the reaction, a soluble salt of the character above set forth, for example, dairy salt, may be added to the mixture, and increases the solution concentration of the calcium hydroxide and reduces or eliminates the soluble arsenic compounds. The quantity of salt added may be as high as 50% of the arsenate present, but it is preferred that from 1 to 5% be employed. The mixture may then be heated to 50-60° C. for about 2 to 4 hours. The soluble arsenate is thereby reduced to 0.5% or less. A small proportion of the added salt, say from a trace to 0.5% is allowed to remain in the product, and appears to retard or prevent the tendency for the formation of soluble arsenic compounds therein.

In treating calcium arsenate containing soluble arsenic to reduce or eliminate the latter, it may be suspended in water with a small amount of slaked lime (say 5%) and about 1% salt and maintained at about 60° C. for 2 to 4 hours. An arsenate containing 2% or more of soluble arsenate may thus have the soluble arsenate content reduced to 0.5% or less.

As the precise character of the soluble arsenic compounds or compounds to which the soluble $As_2O_5$ in the arsenate product is due is not definitely known to me, nor the character of the stages of the reaction between it and the calcium hydroxide, the term soluble arsenic compound has been used to designate it or them in the preceding description and in the following claims. Furthermore, the details of the specific examples above given are not intended to be regarded as limitations upon the scope of the invention, except in so far as included in the accompanying claims.

This application is in part a continuation of my prior application Serial No. 401,980, filed August 7, 1920.

I claim:

1. The process of manufacturing calcium arsenate which consists in bringing together arsenic oxide and calcium hydroxide in a suspension in water, the latter being in excess, and increasing the solution concentration of the calcium hydroxide above that normal for the temperature in the resulting suspension.

2. The process of manufacturing calcium arsenate which consists in bringing together arsenic oxide and calcium hydroxide in suspension in water, the calcium hydroxide being in excess, adding to the resulting suspension a soluble salt capable of increasing the solution concentration of calcium hydroxide above that normal for the temperature and maintaining the temperature at about 60° C. for 2 to 4 hours.

3. The process of manufacturing calcium arsenate which consists in forming a suspension of calcium hydroxide in water, admixing arsenic oxide therewith, the calcium hydroxide being in excess, adding 1 to 5% salt to the mixture, and raising the temperature to about 60° C.

4. The process of removing soluble arsenic from calcium arsenate, which consists in suspending it in water in the presence of excess calcium hydroxide and of salt.

5. The process of removing soluble arsenic from calcium arsenate, which consists in suspending it in a suspension of calcium hydroxide having a solution concentration above normal for the temperature.

6. The process of removing soluble arsenic from calcium arsenate, which consists in suspending it in water in the presence of excess calcium hydroxide and 1% of salt and maintaining the suspension at 60° C. for about 2 hours.

CROMWELL B. DICKEY.